Patented Aug. 24, 1937

2,090,772

UNITED STATES PATENT OFFICE 2,090,772

FLUORINATED SOLVENTS AND PROCESS FOR MAKING THE SAME

Peter J. Wiezevich, Elizabeth, N. J., assignor to Standard Oil Development Company No Drawing. Application March 17, 1933, Serial No. 661,414

6 Claims. (Cl. 260—162)

This invention relates to the manufacture of improved solvents and more particularly it relates to the manufacture of fluorine derivatives of hydrocarbons, and products containing the same, which are substantially non-toxic and non-inflammable.

The solvents generally used in dry cleaning, extraction, dewaxing, and other operations, are petroleum and coal-tar fractions such as naphthas, benzol, etc. Owing to the high inflammability of such materials, chlorinated derivatives have been mixed with these solvents to render them non-inflammable. These mixtures are far from being the most desirable products for, although they are non-inflammable, they are highly toxic owing to the toxicity of both of the compounds used in the mixture. Furthermore, they hydrolyze in the presence of moisture to produce hydrochloric acid which is highly corrosive.

An object of this invention is to eliminate these further disadvantages by producing solvents that are substantially non-toxic and non-inflammable, also solvents which are stable and therefore non-corrosive.

A further object is to produce fluorine derivatives of hydrocarbons of a suitable boiling range so as to eliminate excessive losses of solvents and the difficulty of driving off the last traces of the solvent. A boiling range of about 120° F. to 380° F. is found suitable for this purpose.

Fluoro hydrocarbons alone may be used but it is preferred to employ hydrocarbons that are partially both chlorinated and fluorinated, since the fluorine present appears to counteract the toxic effect of chlorine. Furthermore, the use of both makes it easier to reach a halogen content sufficient to make the resulting compound or mixture of compounds non-inflammable. It is also more economical to employ as much chlorine as is possible without retaining appreciably dangerous toxic properties.

It is found possible to produce such products in a number of ways, as will be shown hereafter:

1. *Direct fluorination.*—Fluorine is generated preferably in corrosion resistant apparatus (such as hard rubber, corrosion-resistant metals, ceramics, etc.) and the fluorine is then contacted with the hydrocarbon or chlorinated hydrocarbon with or without the presence of a solvent and preferably in the presence of a halogenation catalyst. Vapor phase fluorination may also be employed. The fluorine may be prepared in a number of ways, the preferable method consisting in electrolyzing a fused metallic fluoride such as $KF \cdot HF$ or $CaF_2$.

2. *The addition of hydrogen fluoride to unsaturated hydrocarbons or unsaturated chloro hydrocarbons.*—This may be accomplished by direct contact of the hydrogen fluoride with the unsaturated hydrocarbon or chlorinated derivative, with or without the presence of a catalyst, preferably at pressures above atmospheric and at slightly elevated temperatures. Another method involves the reaction of the unsaturated or chloro unsaturated hydrocarbons with sulfuric acid and subsequent contacting with hydrogen fluoride and distilling of the desired product.

It may be more easily accomplished by absorbing the unsaturated hydrocarbon or chlorohydrocarbon in strong sulfuric acid, and subsequent contacting with a metal fluoride such as fluorspar. Heating or steaming such a mixture will drive off the fluorinated product. After absorption of the hydrocarbon in sulfuric acid, chlorine may be introduced by bubbling the gas through the mixture.

3. *The interaction of a metallic fluoride with a halogenated hydrocarbon.*—By heating, for instance, chlorinated naphthas with antimony trifluoride or pentafluoride, high yields of chloro fluoro compounds can be obtained.

Chlorinated gasoline or naphtha can be heated with antimony pentafluoride in a closed bomb and preferably in the presence of a catalyst such as bromine, antimony trichloride, etc. Upon standing at 200–400° C. for several hours, a portion of the chlorine is replaced by fluorine, giving a chloro-fluorinated gasoline or naphtha.

Another method for producing fluoro compounds is by refluxing or distilling chlorinated hydrocarbons in the presence of metal fluorides such as antimony trifluoride, with or without small amounts of catalyst such as antimony pentachloride. As an example, a sample of stabilizer bottoms boiling up to 70° C. was treated with boron fluoride, hydrolyzed with water, distilled, and the fraction boiling below 100° C. was chlorinated to 25% chlorine. One portion of this material (A) was fractionated in a glass column, while another portion (B) of the same product was fractionated in the presence of antimony trifluoride. The results obtained are given below:

A

| Temp. range °F. | Percent distillate | Sp. gr. | Burning test |
|---|---|---|---|
| 104-230 | 14.5 | 0.806 | Yes |
| 230-275 | 24.5 | 0.919 | Yes |
| 275-320 | 28.5 | 1.028 | No |
| 320-374 | 20.5 | 1.100 | No |
| 374-410 | 6.7 |  | No |
| Residue and loss | 5.3 |  |  |

B

| | | | |
|---|---|---|---|
| 104-230 | 22.5 |  | Yes |
| 230-275 | 18.5 | 0.931 | Yes |
| 275-320 | 51.5 | 1.029 | No |
| Residue and loss | 7.5 |  |  |

It can be seen that treatment with the fluoride lowered the boiling point of the product considerably. The burning test designates whether the sample flashes when poured on a glass plate and contracted with a burning match. It is possible to blend lower fractions with the higher fractions to produce a non-inflammable mixture. Also, the lower inflammable fractions may be recirculated and given a second treatment to increase the halogen content.

This process is not limited to the hydrocarbons or their chlorinated derivatives. Other derivatives of hydrocarbons such as alcohols, esters, ethers, chloro ethers, and other compounds which will give non-toxic and/or non-inflammable solvents boiling in the desired range specified above, may be used.

As an example, an alcohol or chloro-alcohol may be treated with aqueous hydrofluoric acid at a temperature of about 100–250° C., giving a fluoro derivative. Polyhydroxy compounds may be treated in a similar manner. Various blends of the fluoro or chloro fluoro compounds may be made with other solvents such as carbon tetrachloride, trichlorethylene, etc., the amount of fluoro compounds being sufficient to suppress the harmful effect of the chlorine.

It will be understood that the above examples are given by way of illustration only and my process may be carried out in the various modifications. I do not, therefore, wish to limit my invention to the specific methods of procedure given in the description but only by the appended claims in which it is my intention to claim all novelty inherent in the invention.

I claim:

1. A solvent essentially comprising a mixture of fluorinated and chlorinated hydrocarbons boiling in the range of 120 degrees to 380 degrees Fahrenheit, derived from normally liquid open chain hydrocarbons boiling in the naphtha range and being substantially non-toxic and non-inflammable.

2. A solvent essentially comprising a non-inflammable mixture of fluorinated petroleum hydrocarbons boiling in the range of approximately 120 to 380 degrees Fahrenheit and derived from normally liquid open chain hydrocarbons boiling in the naphtha range.

3. A solvent boiling within the naphtha range and essentially comprising a mixture of halogenated normally liquid open chain hydrocarbons of petroleum origin containing a sufficient amount of chemically combined fluorine to be substantially non-toxic and non-inflammable.

4. A solvent having an initial boiling point of about 120° F. and a final boiling point of about 380° F. essentially comprising a mixture of halogenated normally liquid open chain hydrocarbons of petroleum origin containing sufficient chemically combined fluorine to be substantially non-toxic and non-inflammable.

5. The process which comprises fluorinating a mixture of compounds of the class consisting of hydrocarbons and chlorinated hydrocarbons having a number of carbon atoms corresponding to petroleum naphthas, and separating from the fluorinated product a fraction having a boiling range of approximately 120° to approximately 380° F.

6. A process of preparing an improved solvent which comprises reacting fluorine with a mixture of compounds selected from the class consisting of petroleum naphthas, chlorinated petroleum naphthas and unsaturated hydrocarbons and chloro hydrocarbons having a similar number of carbon atoms, under controlled conditions, whereby mixed fluorinated compounds are formed, and separating by distillation from said mixed product a fraction having a boiling range of approximately 120° to approximately 380° F.

PETER J. WIEZEVICH.